Oct. 21, 1924.
O. B. PECK, JR
1,512,305
APPARATUS FOR CENTRIFUGAL CONCENTRATION
Filed Oct. 3, 1923
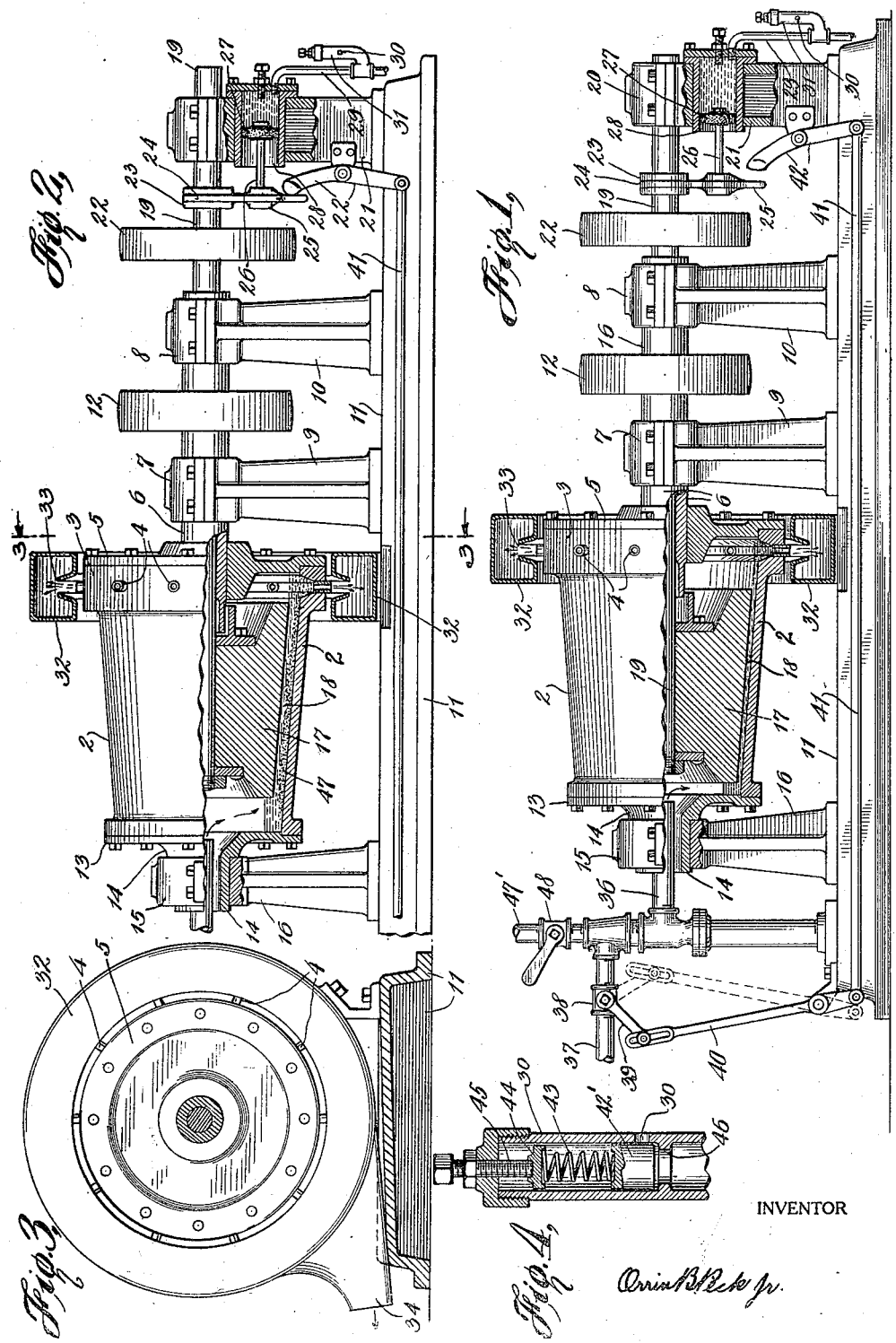
INVENTOR
Orrin B Peck Jr.

Patented Oct. 21, 1924.

1,512,305

UNITED STATES PATENT OFFICE.

ORRIN B. PECK, JR., OF LOS ANGELES, CALIFORNIA.

APPARATUS FOR CENTRIFUGAL CONCENTRATION.

Application filed October 3, 1923. Serial No. 666,277.

*To all whom it may concern:*

Be it known that I, ORRIN B. PECK, Jr., a citizen of the United States, residing at #1433 West 48th Street, in the city of Los Angeles, State of California, have invented certain new and useful Improvements in Apparatus for Centrifugal Concentration, of which the following is a specification.

My invention relates to that type of centrifugal concentrators which operate in successive cycles alternately accummulating a bed or load of concentrates in a rotating vessel and then discharging the same, and the method by which the bedding or separating lodgment of the concentrates largely governs the agency of such separation.

In the drawing, Fig. 1, is partly a side elevation, and partly a central section of my concentrating apparatus, showing the internal part or core moved to its fullest extent towards the small or feed end of the concentrating vessel.

Fig. 2 is similar to Fig. 1, but showing the core in position at the discharge end of the vessel, the feed pipes and the valve mechanism to the concentrator being omitted.

Fig. 3 is a transverse section of Fig. 1, on line 3—3, of Fig. 1, looking in the direction of the arrows.

Fig. 4 is a central, vertical cross-section of certain relief valve mechanism detached, and enlarged.

In order to give a better understanding of certain causes and effects in operation of my concentrator, and the following description of some of its parts, I will state, as has been explained in part, in prior descriptions of this art, that all finely divided mixed solids fed into the revolving vessel of a centrifugal concentrator, under like conditions, are subjected to the same degree of centrifugal force, and are thrown outward from the axis towards lodgement on the inner circumferential wall of the vessel; that the intensity of such lodgement of constituents of like mass, is approximately as their respective specific weights; that lodgement does not in itself effect separation or concentration, but that when liquid, as water, is employed to assist in separation through its washing or scrubbing energy, such energy should be developed with force sufficient to prevent fixed lodgement of constituents of relatively lighter specific weight, and to separate and carry the same to discharge.

It should also be understood that in a concentrator of this type having a rotatable vessel and an internal, differentially rotatable, relatively longitudinally moveable core, such liquid scrubbing force or energy is mainly engendered through two agencies, one source being by reason of volume of liquid being fed to the concentrator, and the other being by reason of the differential movement in rotation, of the concentrating vessel and core in the vessel.

These members so differentially operating in contact with the liquid in the concentrating passage, causes a spiral frictional liquid scrub on the surface of the lodging solids in the passage, and the two sources of liquid scrub are intended to be adjusted so their combined energy will separate and keep moving and wash to discharge, the relatively lighter constituents to form in the concentrating passage in the vessel, and leave or permit the heavier constituents in a bedding accretion.

It should be further understood that the washing force of the liquid with a constant volume being fed to the concentrator, and a constant differential movement in rotation of the vessel and core, will vary greatly with a variation in size of the concentrating channel, largely based on the very well known principle that the smaller the orifice for passage of a constant quantity of liquid the greater will be its velocity and its moving energy. Therefore, in operation of a centrifugal concentrator of this type, from the fact that it is important to maintain a constant liquid washing force for separation, it is also very important to maintain a constant sized orifice, or flow channel in the separating passage to effect separation, and as a sequence, in my present improvements I have provided means by which the size of this channel will be automatically regulated by or as a result of the bedding concentrates in such channel.

As means of carrying my invention into effect I provide a rotatable conical shaped cylinder or concentrating vessel 2. At the large end of this vessel there is provided an enlargement 3, in which is formed an internal annular channel, having discharge openings 4, in a circumferential row extending from the annular channel through the wall of the vessel for discharge of liquid and material from the vessel.

The vessel at this end is provided with a head 5, which is rigidly mounted on and supported by a rotatable hollow shaft 6, which is journalled in boxes 7 and 8, respectively, mounted on the upper end of stands 9 and 10, which, in turn, are supported on a base plate 11, of the concentrator. The shaft 6, is provided with a pulley 12, by which it may be revolved from any suitable source of power by a belt, not shown, and in this way rotation is imparted to the concentrating vessel.

The small end of the vessel is also provided with a head 13, which has a hollow extended trunnion 14, journalled in a box 15, which is mounted on the upper end of a stand 16, superimposed on the bedplate of the concentrator in like manner as are the stands 9 and 10.

Within the concentrating vessel is provided a core 17, which is somewhat smaller in diameter and also somewhat shorter than such internal dimensions of the vessel. This core is tapering in form, substantially the same as the internal shape of the concentrating vessel, and is of diameter so when the same is positioned nearest to the small or feed end of the vessel, as illustrated in Fig. 1, there will be a comparatively small space or annular channel 18, around between its exterior and the interior wall or surface of the vessel, which space serves as the concentrating channel or passage of the apparatus.

The core is intended to be smooth on its circumferential surface and is securely mounted on the overhanging end of a shaft 19, which is journalled in the hollow of the shaft 16, passing through such hollow and extending into the vessel suitably to support and carry the core as stated.

This shaft also extends through and out of the opposite end of the hollow shaft, a desired distance so as to be journalled at this end in a box 20, mounted on the upper part of a stand 21, which is supported on the bedplate of the concentrator as shown.

The shaft 19, is provided with a pulley 22, by which it may be revolved and in such revolution impart rotation to the core in the concentrating vessel, the shaft is also adapted to be moved longitudinally during operation, carrying the core from its initial position at the small end of the vessel, as illustrated in Fig. 1, to its extreme position at the large end of the vessel, as illustrated in Fig. 2 and again to its initial position.

Rigidly mounted on the shaft is a collar 23, which rotatably engages a ring collar 24, the latter having a depending portion 25, as illustrated, and attached to this part 25, is a rod 26, in position to carry at its opposite end a piston head 27, operating in a hydraulic cylinder 28, which is securely fastened to the stand 21, as shown in the drawing. This cylinder is shown having but one closed end, the piston head 27 serving to prevent liquid flow from the other end.

Liquid may be supplied under pressure to the closed end of the cylinder 28, preferably from an elastic or yieldable source, by a pipe 29, so that the piston head when desired will be forced hydraulically in direction towards the small end of the vessel, and the shaft 19, through medium of the rod 26, the parts 25 and 24, as well as the collar 23, will in this way be moved longitudinally, carrying the core from a position illustrated in Fig. 2, to its initial position shown in Fig. 1, and thereafter, as liquid is forced out of this end of the cylinder 28, as will be herein later explained, through an opening 30, in a relief valve 31 or otherwise, the piston head 27, will travel in the opposite direction, permitting the core carried by its shaft to be moved or forced back to the position illustrated in Fig. 2 nearest the large, or discharge end of the vessel, for the purposes and in the manner hereafter stated.

Surrounding the enlargement 3, of the vessel, there is provided a launder 32, of comparatively thin walls, which is mounted on the bedplate of the concentrator, and is provided with an annular slot or opening 33, in radial alignment with the discharge holes 4, in position to receive the discharge of liquid and material from the vessel and flow the same for further disposition from the extension 34, Fig. 3 of the launder.

There is provided a feed pipe 36, entering the hollow trunnion 14, of the vessel, in a manner to deliver liquid and material for separation in the space within the vessel, between that end of the vessel and the small or feed end of the core. This pipe may be connected through medium of a branch pipe 37, with any suitable source of supply of liquid and material.

Located in the pipes 37, is a valve 38, by which flow or feed of material and liquid may be regulated, or stopped as desired. This valve is provided with a handle 39, which engages the upper end of a fulcrumed lever 40, which lever, at its lower end is hinged to a rod 41, and this rod at its opposite end connects with a hinged lever 42, as illustrated in the drawing.

The lever 42, is of suitable length and position so that its upper end will contact with the lower part 25, of the element 24 during the latter part of outward movement of the shaft 6, so that the part 25, at the time the core is nearing its extreme position towards the large end of the concentrating vessel, will move the upper part of the lever 42, in that direction, traveling the rod 41, and swinging the upper end of the lever 40, which, in turn, in its movement, will change the position of the valve handle 39, and close the feed of material off from the concentrating vessel, which latter position is indicated in dotted line in Fig. 1.

After the shaft with the part 25, has been restored to the position illustrated in Fig. 1, the upper end of the lever 42 being then out of contact with the part 25, the valve handle 39, may be manually or otherwise swung to the position shown in full line in Fig. 1, thereby again opening the valve for supply of liquid and material into the concentrating vessel.

As means in part for regulating the resistance to movement of the core towards the large end of the concentrating vessel, afforded by the liquid in the cylinder 28, there is provided the escape valve 31, which is illustrated in enlarged vertical section in Fig. 4, in which there is a reciprocatable plunger 42', contacting with a spring 43, which in turn contacts with a disc 44, seated against an adjusting screw 45.

The chamber in this valve 31, communicates with the pipe to the cylinder 28, and the escape opening 30 is positioned above the valve seat 46, so that by movement of the screw 45, the pressure of liquid in the cylinder 28 will be regulated and adjusted as desired, before the same will escape to relief through the opening 30, thereby largely automatically regulating and predetermining the liquid pressure required to force the core towards the large end of concentrating vessel.

As has been hereinabove stated, during concentration it is important to maintain an approximately uniform liquid wash in the concentrating passage, and that with constant feed and speed conditions, this wash is very largely governed by the size of the flow channel in this passage and its constancy.

In operation, at the commencement of each cycle of performance of the concentrator, the core being in position at the feed or small end of the vessel, these two numbers are rotated at desired respective speeds, and liquid with material for separation is introduced in appropriate desired volume, so the liquid will flow into and fill the concentrating passage as well as sufficiently accumulate in the feed end of the vessel to exert pressure on that end of the core to press the core towards the discharge, or large end of the vessel.

This movement of the core serves to enlarge the concentrating passage and lessens the resistance to flow through it, which in turn, automatically lessens the endways pressure on the core. The liquid flowing through the concentrating passage also exerts an endwise pressure on the core, from the fact that both the vessel and core are conical in form.

Resistance to the endwise movement of the core is afforded by pressure of liquid in the cylinder 28, as has already been explained, which resistance should be adjusted to balance and coordinate with the endways pressure on the core, so as to permit the core to be gradually and properly travel, or crowded endways by the liquid in the vessel as the concentrates accumulate in a bed or accretion 47, in the separating passage, and thereby maintain such passage of proper size for flow of liquid, to necessitate such flow to develop or exert washing force of sufficient predetermined intensity to scrub and carry through the separating passage to discharge, lighter constituents desired, at the same time permitting the relatively heavier constituents to progressively bed in the passage to be removed separately during the latter part of the cycle.

This endways movement should automatically continue till the core has reached the limit of its backward travel, by which time the feed of material for separation will have been automatically closed off by the feed valve, and introduction of clean water will have been started through the water valve 48, and thereafter, as soon as the separated waste material then in transit through the concentrating passage has flowed to discharge from the vessel, the speed of the vessel should be much reduced, which will greatly lessen the centrifugal force and consequently the endways pressure on the core, as well the force then retaining the bedded concentrates in the concentrating passage, and under such conditions, the pressure in the cylinder 28 being relatively greater than the endways pressure on the core, the greater pressure will move the core to its initial position at the feed end of the vessel as rapidly as removal of bedded concentrates will permit.

During the reduced rotation of the vessel, assisted by the return movement of the core, the bedded concentrates will be washed to discharge from the vessel, which will complete the cycle. This being accomplished, the vessel is again properly accelerated; the clean water discontinued; feed of material started, and the cycle repeated.

It will therefore be seen that the bedding concentrates in the concentrating passage is the primary agency which automatically governs the longitudinal movement of the core, and the length of the cycles, and moreover, regulates the predetermined intensity of the liquid washing force for separation and removal to discharge of constituents desired.

The size at which the concentrating passage is maintained may be regulated by adjustment of the pressure affording resistance to endways movement of the core, which resistance may be of any form or through any agency that will serve the purposes described.

During the period of each cycle of operation when the concentrating vessel is being revolved at a relatively slow speed, the feed of material shut off and the bedded concentrates discharged, there is intended to be a flow of comparatively clean water introduced into the vessel through a branch pipe 47', connecting with any suitable source of supply.

This branch pipe contains the valve 48, by which the water flow can be regulated, as well as closed entirely off during the concentrating period.

The length or duration of each cycle of operation of the concentrator is automatically governed by the bedding concentrates of such cycle, from the fact that the concentrating portion of the cycle is completed when the separating passage is sufficiently filled, having then forced the core to the larger end of the vessel. It therefore following that a more rapid bedding shortens the cycle, and a slower bedding, depending on the quantity or percentage of concentrates to be collected, lengthens the cycle.

What I regard as new and desire to secure by Letters Patent is:

1. In a centrifugal concentrator adapted to separation of finely divided solids while mixed with liquid, having constituents of different degrees of specific gravity, the combination of a rotatable vessel member having a separating surface forming the outer wall of a separating passage, a differentially rotatable core member forming the inner wall of the separating passage, and adapted to be automatically moved longitudinally towards the discharge end of the vessel by predetermined pressure of liquid within the vessel, in part incident to progressive accumulation of bedding concentrates within said passage, and means for predetermining said liquid pressure substantially as described 2. In a centrifugal concentrator adapted to separation of finely divided solids while mixed with liquid, having constituents of different degrees of specific gravity, the combination of a rotatable vessel member having a separating surface forming the outer wall of a separating passage, a differentially rotatable core member forming the inner wall of the separating passage, and adapted to be automatically moved longitudinally towards the discharge end of the vessel, by predetermined pressure of liquid within the vessel, in part incident to progressive accumulation of bedding concentrates within said passage, means for predetermining said liquid pressure, and yieldable means for resisting the longitudinal movement of the core, substantially as described.

3. In a centrifugal concentrator adapted to separation of finely divided solids while mixed with liquid, having constituents of different degrees of specific gravity, the combination of a rotatable vessel member having a separating surface forming the outer wall of a separating channel, a differentially rotatable core member forming the inner wall of the separating channel, and adapted to be automatically moved longitudinally towards the discharge end of the vessel, by predetermined pressure of liquid within the vessel, in part incident to progressive accumulation of bedding concentrates within said channel, means for predetermining said pressure, yieldable means for resisting such longitudinal movement of the core, and means for varying the intensity of said resistance, substantially as described.

4. In a centrifugal concentrator adapted to separation of finely divided solids while mixed with liquid, having constituents of different degrees of specific gravity, the combination of a rotatable vessel member having a separating surface forming the outer wall of a separating passage, a differentially rotatable core member forming the inner wall of the separating passage, and adapted to be automatically moved longitudinally towards the discharge end of the vessel, by predetermined pressure of liquid within the vessel, in part incident to progressive accumulation of bedding concentrates within said passage, means for predetermining said pressure, and means for automatically maintaining during concentration the predetermined balance between said resisting pressure and the longitudinal liquid pressure on the core, substantially as described.

5. In a centrifugal concentrator adapted to separation of finely divided solids while mixed with liquid, having constituents of different degrees of specific gravity, the combination of a rotatable vessel member having a separating surface forming the outer wall of a separating passage, a differentially rotatable core member forming the inner wall of the separating passage, and adapted to be automatically moved longitudinally towards the discharge end of the vessel, and means whereby the core member during concentration is automatically moved longitudinally by liquid pressure in part incident to progressively bedding of concentrates in the separating channel, against predetermined yieldable resistance to said movement substantially as described.

6. In a centrifugal concentrator the combination of a rotatable concentrating vessel, a rotatable core member with the vessel both of which members being enlarged from their feed end toward their discharge end, said core adapted to be automatically moved longitudinally during concentration by liquid pressure from the feed end of the vessel, means adapted to resist such longitudinal movement, in engagement with a shaft supporting the core member and means for regulating the resistance to such longitudinal movement of the core, substantially as described.

7. In a centrifugal concentrator the combination of a rotatable cone-shaped concentrating vessel, a rotatable cone-shaped core member within said vessel adapted to be longitudinally moved by liquid pressure in the vessel, a shaft member supporting said core, a hydraulic cylinder adapted to contain liquid for affording resistance to longitudinal movement of the core, means in engagement with said shaft member and communicating with said hydraulic cylinder adapted to convey such resistance to the shaft member, means for supplying liquid to said cylinder and means for regulating the resisting pressure of liquid in the cylinder substantially as described.

8. In a centrifugal concentrator adapted to separation of finely divided solids while mixed with liquid, having constituents of different degrees of specific gravity, the combination of a rotatable vessel member having a separating surface forming the outer wall of a separating passage, a differentially rotatable core member forming the inner wall of the separating passage, and adapted, during the concentrating period to be automatically moved longitudinally towards the discharge end of the vessel by predetermined pressure of liquid within the vessel, in part incident to progressive accumulation of bedding concentrates within said passage, means for predetermining said liquid pressure, yieldable means for resisting the longitudinal movement of the core towards the discharge end of the vessel and yieldable means for automatically moving the core member towards the feed end of the vessel during the unloading period of operation of the concentrator with rapidity governed in part by dislodgment of the bedded concentrates, substantially as described.

ORRIN B. PECK, Jr.